United States Patent [19]
Nagao et al.

[11] Patent Number: 5,491,759
[45] Date of Patent: Feb. 13, 1996

[54] DOCUMENT EDGE DETECTION APPARATUS

[75] Inventors: Kagenori Nagao, Yokohama; Yoshinori Takizawa, Tokyo; Naoko Matsumoto, Yokohama, all of Japan

[73] Assignee: Eastman Kodak Company, Rochester, N.Y.

[21] Appl. No.: 264,533

[22] Filed: Jun. 23, 1994

Related U.S. Application Data

[63] Continuation of Ser. No. 47,908, Apr. 19, 1993, abandoned.

[30] Foreign Application Priority Data

Nov. 25, 1992 [JP] Japan ..................................... 4-314497

[51] Int. Cl.⁶ ..................................................... G06K 9/48
[52] U.S. Cl. ........................... 382/199; 382/197; 382/291
[58] Field of Search ................................. 382/22, 21, 45, 382/46, 48, 18, 199, 197, 291, 286, 289

[56] References Cited

U.S. PATENT DOCUMENTS

| | | | |
|---|---|---|---|
| 4,833,722 | 5/1989 | Morton | 382/22 |
| 5,054,098 | 10/1991 | Lee | 382/45 |
| 5,073,960 | 12/1991 | Nakai et al. | 382/22 |
| 5,136,658 | 8/1992 | Mori | 382/48 |

*Primary Examiner*—Yon J. Couso
*Attorney, Agent, or Firm*—Dennis R. Arndt

[57] ABSTRACT

A document edge detection apparatus that can detect document edges at high speed with good stability and precision, even when the documents have relatively large damaged portions, creases or smears, or have been scanned with a large skew angle.

1 Claim, 5 Drawing Sheets

DOCUMENT EDGE DETECTION APPARATUS

This is a continuation of application Ser. No. 08/047,908, now abandoned.

BACKGROUND OF THE INVENTION

1. Field of the Invention

The present invention relates to a document edge detection apparatus, particularly to a document edge detection apparatus that accurately detects the edges of a document by calculating straight lines representing the edge or edges of a document from document image signals input from a scanner or the like.

2. Description of the Prior Art

In many image processing systems, detecting the edges of scanned document images is an important preprocessing function. To enable optical character recognition to be applied to forms on which characters are written at prescribed locations relative to the form's edge, it is necessary to be able to detect the edge of the form so as to be able to use it as a reference for reading specific character locations. In the course of the edge detection process it is also possible to detect document skew, which is information that can be used as supplementary data in the subsequent character recognition stage. Using the edge detection process to detect the document skew angle is also useful when it is necessary to apply skew correction to the image of a document that has been scanned on the skew. In addition, using a plain paper printer to print out unmodified images of documents that have a dark background involves a heavy consumption of toner, so edge detection is also used in such cases when it is desired to eliminate the dark background tones.

Because edge detection of document images is thus utilized in a variety of ways, various edge detection methods have been proposed. One such conventional method of detecting the edges of documents involves using Huffman conversion to detect straight line components representing document edges. In another method, a document image is scanned both ways in the primary scanning direction, image continuities from white to black or black to white (as determined by the number of continuous black or white pixels exceeding a set value) are extracted as possible edge points, from which points that expand the image region are selected as edge point coordinates and, using the method of least squares, these coordinates are used to obtain straight line equations that represent edges.

However, each of these methods has drawbacks. In the case of the first method, the problem is that it involves processing that is complex as well as time-consuming, while a further problem is that it can be difficult to detect an edge if the document contains image components that are located parallel to the edge. In the case of the second method, points on relatively large damaged portions, creases or smears included in the document may be seen as edge pixels, so when a straight line is approximated using calculations based on edge point coordinates that include such inappropriate points, the straight line thus obtained will not correctly represent the document edge.

SUMMARY OF THE INVENTION

The object of the present invention is therefore to provide a document edge detection apparatus that is capable of detecting document edges at high speed with good stability and precision, even when the documents have relatively large damaged portions, creases or smears, or have been scanned askew.

In accordance with the present invention, the above object is attained by a document edge detection apparatus that is capable of detecting document edges at high speed with good stability and precision, even when the documents have relatively large damaged portions, creases or smears, or have been scanned askew, by the steps of obtaining candidate edge points and eliminating inappropriate candidate points by creating direction vectors by connecting adjacent pairs of candidate edge points and counting the number of direction vectors that are parallel or orthogonal to each vector, the document edge detection apparatus comprising binarization means for binarizing a document multilevel image, edge point detection means whereby coordinates of a plurality of points along an edge of a thus-binarized rectangular document image in a two-dimensional image space are detected at equal intervals in primary and secondary scanning directions, direction vector creation means for creating direction vectors by connecting adjacent pairs of the plural edge points thus detected by the edge point detection means, counting means for counting the number of direction vectors that have a similar inclination to each of the plurality of direction vectors created by the direction vector creation means and assumed to be on a document edge and the number of direction vectors that have a prescribed angle of displacement to each of the direction vectors, elimination means that retains the points of the direction vector with the highest count and of direction vectors with a similar inclination thereto and eliminates points belonging to other direction vectors, and edge calculation means that uses points not eliminated to obtain an equation for a straight line representing an edge of the document image.

Thus, with the apparatus according to the present invention, a document image is binarized, the binarized image is scanned horizontally and vertically and compared with preset vertical and horizontal patterns, and when a match is found the coordinates of the points are stored in memory as being candidate edge points. For all of these points, direction vectors are created by connecting two adjacent points. For each direction vector thus created, the number of direction vectors which are parallel or at right-angles to the vector is counted and the point coordinates of the direction vector with the highest count is retained together with the coordinate points of vectors parallel thereto, and these coordinates are used to calculate an equation for a line that passes through those points, thereby enabling document edges to be detected at high speed with good stability and precision.

Further features of the invention, its nature and various advantages will become more apparent from the accompanying drawings and following detailed description of the invention.

DESCRIPTION OF THE PREFERRED EMBODIMENT

Figure 1:
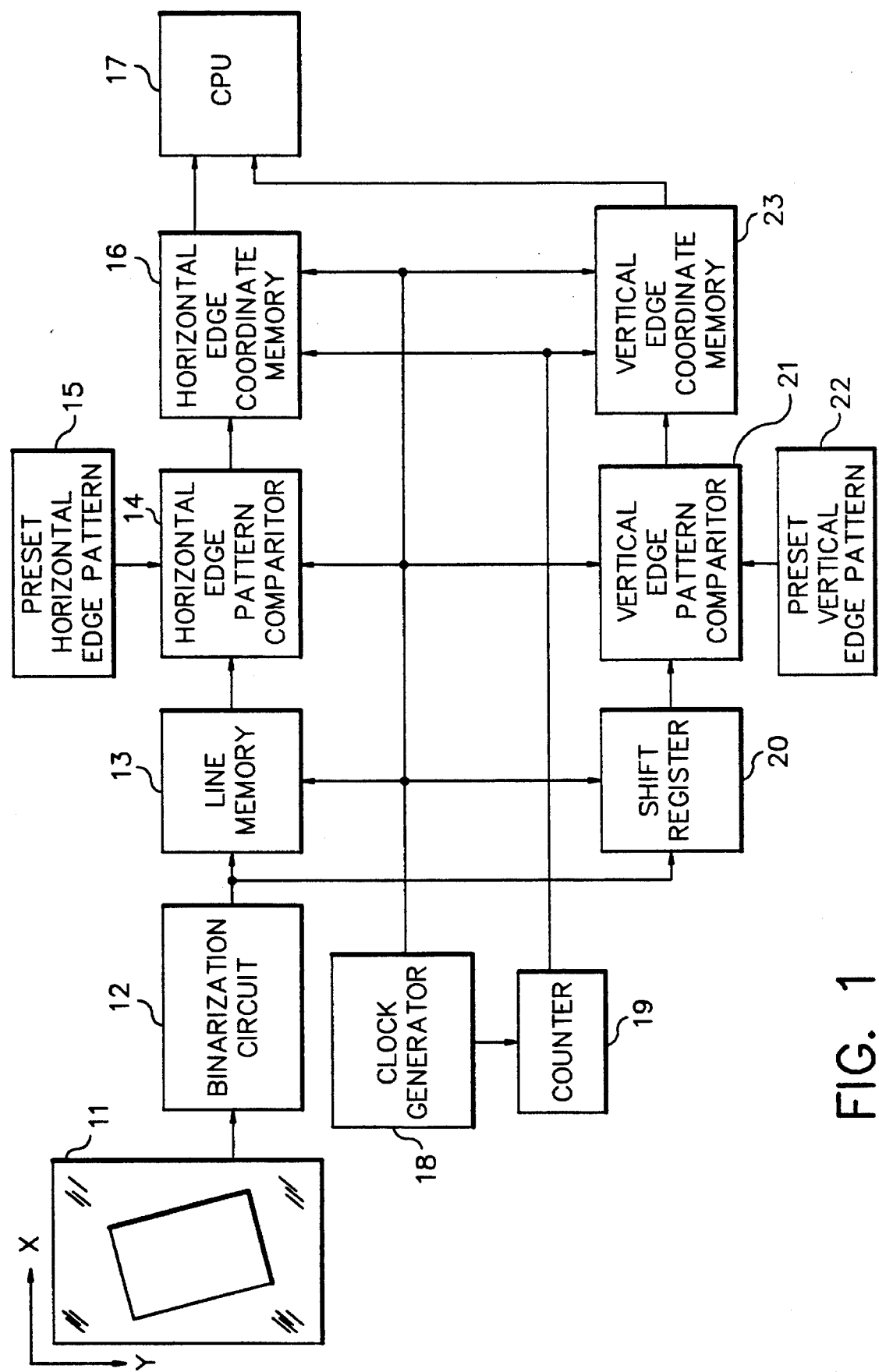
FIG. 1 is a schematic diagram of an embodiment of the document edge detection apparatus according to the present invention.

FIG. 1 is a schematic diagram of an embodiment of the document edge detection apparatus according to the present invention. With reference to FIG. 1, the document edge detection apparatus is comprised of a binarization circuit 12 for binarizing a multilevel input image 11, a line memory 13 whereby the image output by the binarization circuit 12 is scanned in the secondary scanning direction to extract a horizontal edge pattern. The apparatus also includes a shift register 20 whereby the image output by the binarization circuit 12 is scanned in the primary scanning direction to extract a vertical edge pattern, a horizontal edge pattern comparator 14 whereby the output signals from the line memory 13 are compared with the preset horizontal edge pattern 15, a vertical edge pattern comparator 21 whereby the output signals from the shift register 20 are compared with the preset vertical edge pattern 22, and a horizontal edge coordinate memory 16 for memorizing the coordinates of candidate horizontal edge points detected by the horizontal edge pattern comparator 14. A vertical edge coordinate memory 23 is adapted to memorize the coordinates of candidate vertical edge points thus detected, a CPU 17 which uses the horizontal and vertical edge point coordinates thus stored in the above coordinate memories to detect points along the document edge. A clock generator 18 receives an external synchronization signal and generates synchronization clocks which are supplied to other components, and a coordinate counter 19 which provides the horizontal edge coordinate memory 16 and vertical edge coordinate memory 23 with the location of the edge pattern within the image when the horizontal edge pattern comparator 14 and vertical edge pattern comparator 21 produce a True output.

The operation of the document edge detection apparatus according to the arrangement of the above embodiment will now be described. First, a document is scanned by a scanner or other such image input means, with the primary scanning being in the X direction, and the image data thus obtained is input to the document edge detection apparatus as input image 11, where it is binarized by the binarization circuit 12.

The process of detecting candidate horizontal and vertical edge points in the binarized image output by the binarization circuit 12 will now be described. To detect candidate points along a horizontal edge, signals output by the binarization circuit 12 are input to the line memory 13 which holds n lines of image data. If P(x, y) is the result of the binarization of pixels at location (x, y) of the input image, the line memory 13 does not store all of the binarized image data, but n lines of pixel value P(kx0, y), (k=1, 2, . . . ) at every x0 pixels in the primary scanning direction. At the same time that the line memory 13 stores the pixel value P(kx0, y), (k=1, 2, . . . ) at every x0 pixels, it transmits n lines of image data P(kx0, a), (a=y, y−1, . . . y−n+1) that includes the stored pixel values to the horizontal edge pattern comparator 14. The horizontal edge pattern comparator 14 compares the output signals from the line memory 13 with a preset horizontal edge pattern, and transmits to the horizontal edge coordinate memory 16 a True signal if the two match and a False signal if they do not match.

Figure 2:
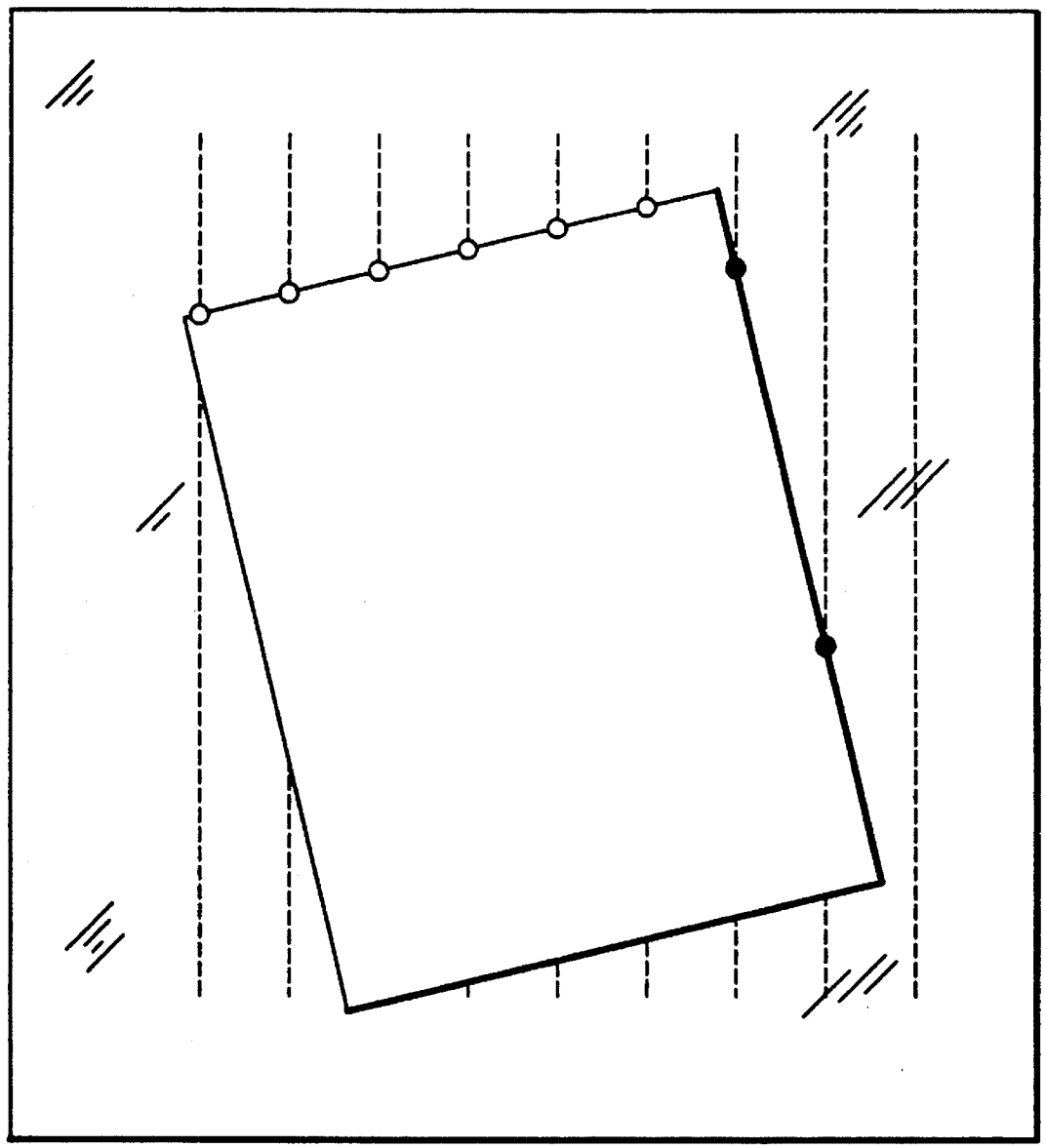
FIG. 2 is a drawing illustrating how points along a vertical edge may be detected in the course of detecting points along a horizontal edge of a document with a large skew angle.
Figure 3:
FIG. 3 shows an example of a horizontal edge pattern when n=8.
Figure 5:
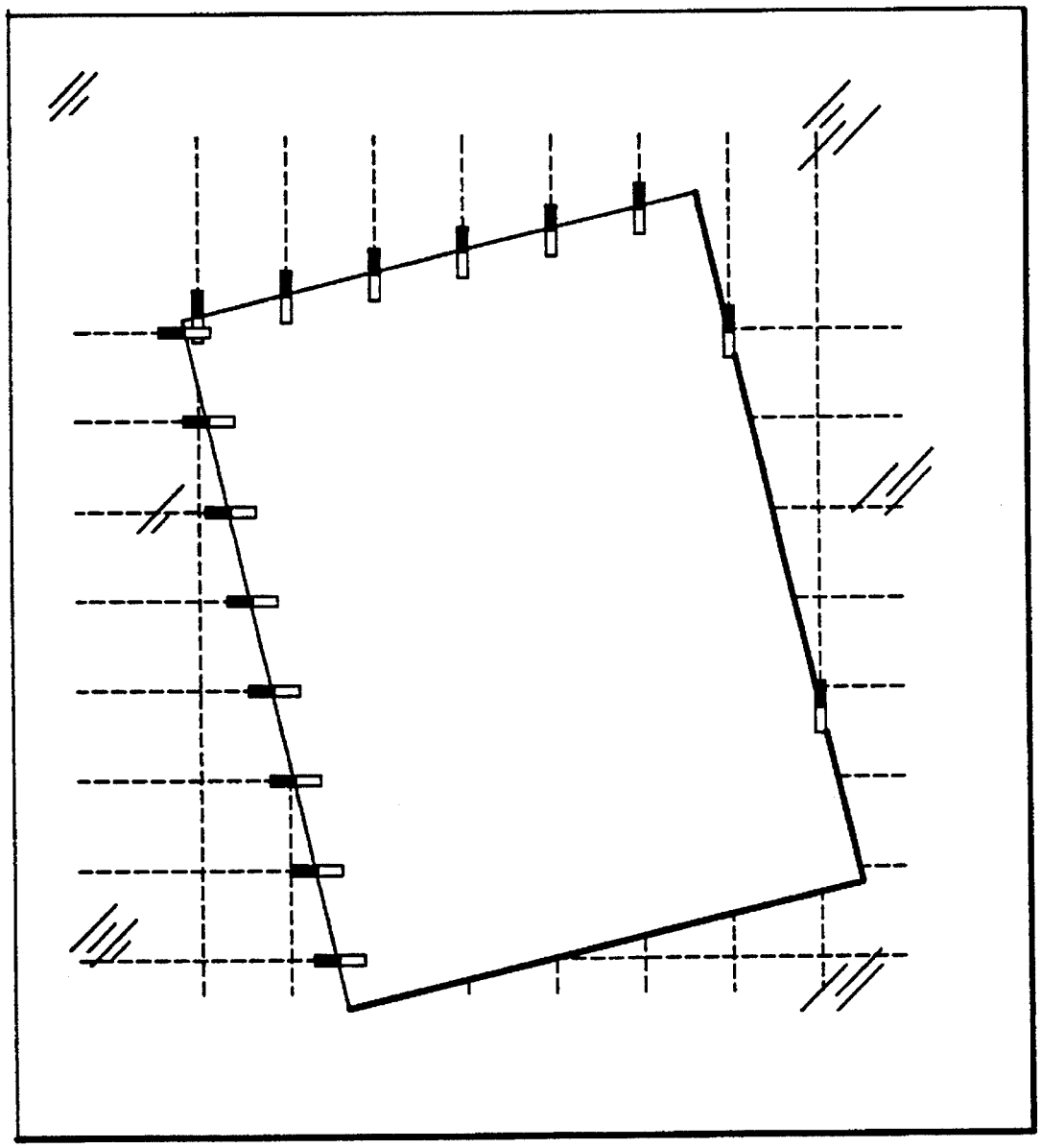
FIG. 5 is a conceptual diagram of a search operation to find vertical and horizontal edge patterns by the scanning of image data in the primary and secondary scanning directions.

FIG. 3 shows an example of a preset horizontal edge pattern in which n=8 used for comparison by the horizontal edge pattern comparator 14. If a document is input askew, points along the vertical edge may be erroneously detected as horizontal edge points. FIG. 2 shows such an example of vertical edge points being detected during a horizontal edge point detection process. However, as described below, the document edge detection apparatus of the present invention can handle such a situation without problem. Next, when the horizontal edge pattern comparator 14 produces a True output, meaning when the output signal from the line memory 13 matches the preset horizontal edge pattern, the signal output of the coordinate counter 19 is stored in the horizontal edge coordinate memory 16. This sequence corresponds to the scanning of image data x=k·x0, (k=1, 2, 3, . . . ) in the secondary direction in an attempt to find a horizontal edge pattern. The concept of this operation is illustrated by FIG. 5. While the foregoing is the process used to detect points along a horizontal edge, more or less the same operation is followed with respect to a vertical edge, and coordinates of vertical edge points are stored in the vertical edge coordinate memory 23.

The output of the binarization circuit 12 also goes to an m-location shift register 20, from where m pixels of binarized image data P(b, y), (b=x, x−1, . . . , x−m+1), in the primary scanning direction, are output to the vertical edge pattern comparator 21. The vertical edge pattern comparator 21 compares the image data from the shift register 20 with a preset vertical edge pattern. This comparison is performed every y0 lines. Output at other times from the vertical edge pattern comparator 21 is false.

Figure 4:
FIG. 4 shows an example of a vertical edge pattern when m=8.

FIG. 4 shows an example of a preset vertical edge pattern in which m=8 used for comparison by the vertical edge pattern comparator 21. As in the case of the horizontal edge operation, even if a document is skewed, as described below, it does not present a problem to the document edge detection apparatus of the present invention. When the vertical edge pattern comparator 21 produces a True output, meaning when the output signal from the shift register 20 matches the preset vertical edge pattern, the signal output of the coordinate counter 19 is stored in the vertical edge coordinate memory 23. This sequence corresponds to the scanning of image data y=h· y0, (h=1, 2, 3, . . . ) in the primary direction in an attempt to find a vertical edge pattern. The concept of this operation is illustrated by FIG. 5.

In this way, the coordinates of a plurality of points thought to be located along the horizontal edge are stored in the horizontal edge coordinate memory 16 and the coordinates of a plurality of points thought to be located along the vertical edge are stored in the vertical edge coordinate memory 23. The point coordinates thus stored in the memories are regarded as candidate edge points. However, coordinates of points detected on relatively large damaged portions, creases or smears may not be on the edge of the original document. Also, when a document is input with a large skew angle, an edge other than the intended edge may be detected. FIG. 2 shows an example of how, during a horizontal edge point detection process, vertical edge points are also detected. In the case of the edge detection apparatus according to this invention, the edge detection CPU 17 connected downstream of the coordinate memories eliminates edge candidate points that do not correctly represent the position of an edge, owing to the presence of document damage or smearing, and point coordinates that are on one edge but, owing to the document being skewed, are detected as being on another edge.

The steps of the edge detection operation of the CPU 17 will now be described, with reference to the detection of a horizontal edge. It is assumed that the horizontal edge coordinate memory 16 contains data on i horizontal edge candidate points H0, H1, ..., Hi–1 and that the vertical edge coordinate memory 23 contains data on j vertical edge candidate points V0, V1, ..., Vj–1, and that candidate points H0, H1, ..., Hi–1, and V0, V1, ..., Vj–1, are x and y coordinates, respectively, arranged starting from the smallest.

Step 1: Direction vectors S0, S1, ..., Si–2 are created joining line segments H0 H1, H1 H2, ..., Hi–2 Hi–1.

Step 2: Direction vectors T0, T1, ..., Tj–2 are created joining line segments V0 V1, V1 V2, ..., Vj –2 Vj–1.

Step 3: With respect to each of the direction vectors Sk (k=0, 1, 2 ..., i–2), S0, S1, ..., Si–2 are searched for direction vectors that are parallel to Sk, and T0, T1, ..., Tj–2 are searched for direction vectors oriented orthogonally to Sk, producing a total of Nk vectors. Direction vectors Sa=(ka, ya) and Sb=(xb, yb) that have a perpendicular-horizontal relationship are said to satisfy the terms of equation (1).

[Horizontal] |xa yb–xb ya|<Δ

[Vertical] |xa xb+ya yb|<Δ          (1)

Here, Δ represents a very small number; some error is absorbed by making it not zero.

Step 4: The largest of the Nk values obtained in step 3 is termed Np. The points Hp, Hp +1 of the direction vector Sp corresponding to Np, together with the points of vectors parallel to Sp, are retained in the horizontal edge coordinate memory 16, and all other points are erased.

Step 5: The method of least squares is used to obtain an equation to calculate a straight line that passes through the candidate points remaining in the horizontal edge coordinate memory 16, which is taken as representing the document's horizontal edge.

Figure 6:
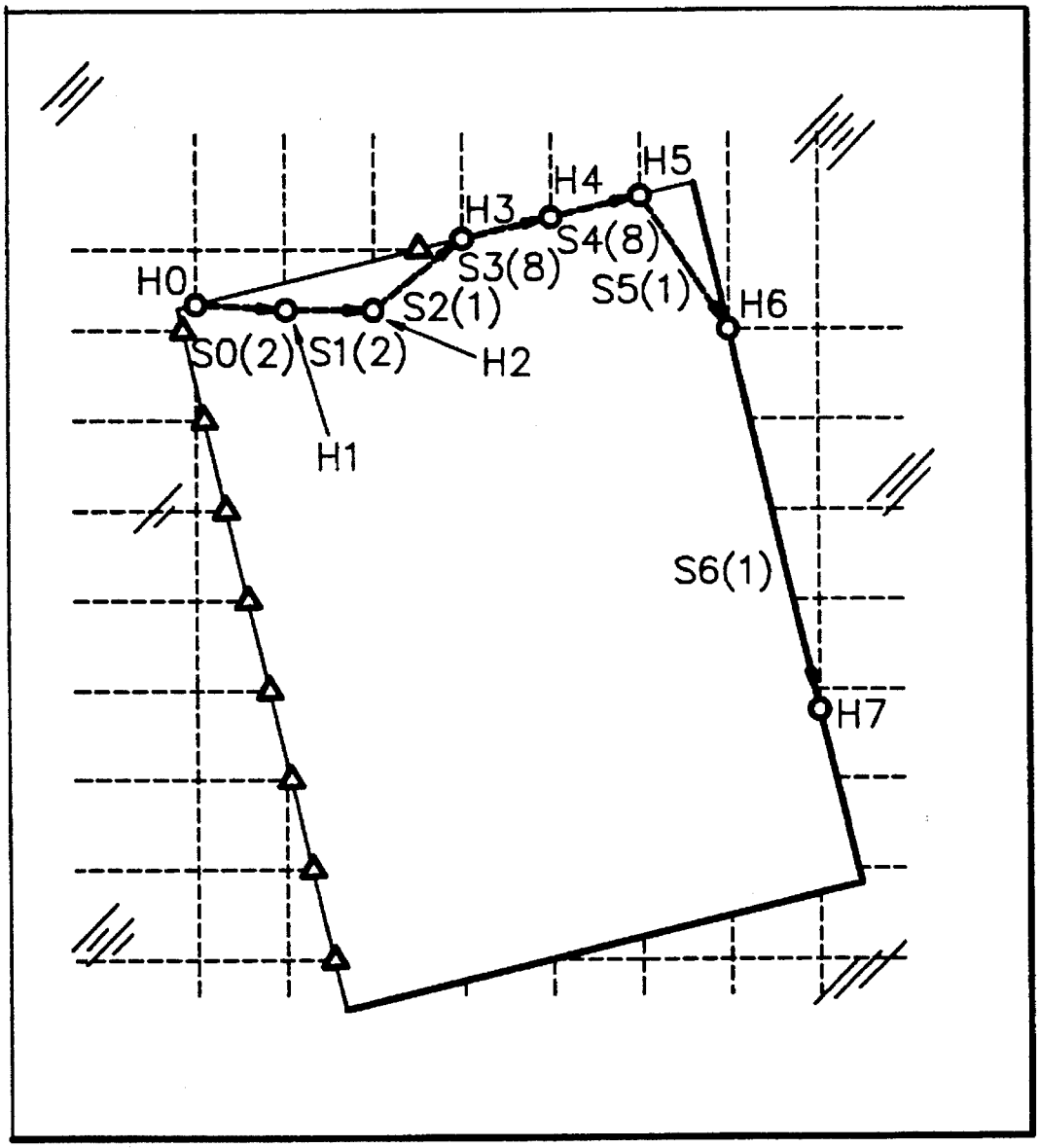
FIG. 6 is a conceptual diagram of an operation to detect a horizontal edge of a document by the edge detection apparatus of the present invention.

FIG. 6 is a conceptual drawing of an example in which the above process is applied to an actual document image. The document has a relatively large soiled potion and a large skew angle. In the drawing, 0 is a candidate point on the horizontal edge and Δ a candidate point on the vertical edge. In the document shown in the drawing, eight horizontal edge candidate points have been detected, and eight vertical edge candidate points. The points detected as horizontal edge candidate points include points (H1 and H2) that do not indicate the position of the edge correctly, owing to the presence of the soiled portion, and points (H6 and H7) that are actually on another edge, the cause in this case being the large skew angle of the document. In FIG. 6, S0 to S6 are direction vectors connecting adjacent horizontal edge candidate points, and the accompanying numbers in parentheses denote the sum total of the number of direction vectors having a parallel relationship with vectors included in S0 to S6, added to the number of direction vectors having a perpendicular relationship with vectors included in T0 to T6. In the example shown in FIG. 6, therefore, in step 4 S3 (or S4) is selected and S3 points H3 and H4 are retained, together with points H4 and H5 of S4, which is parallel to S3, and step 5 is used to derive an equation for a straight line that passes these three points H3, H4 and H5.

The edge detection apparatus according to the present invention prevents points that are not along the document edge being regarded as edge pixels, owing to the presence of creasing or smearing or the like, by utilizing the fact that such points are usually a minority to eliminate them by the rule of the majority decision. This ensures more reliable detection of document edges, especially as it also takes into consideration points on an edge that is orthogonal to the edge of interest.

Although the above embodiment has been described with reference to horizontal edge detection, the same procedure can be readily applied to the detection of vertical. Also, the edge pattern used by the horizontal edge pattern comparator 14 can be modified for detection of another edge. Moreover, while in step 3 the condition of parallelicity between vectors in one direction and vectors in the other direction is shown by equation (1), as horizontal and vertical edge candidate points are detected at equal y and x intervals, the terms of equation (2) below can simplified as shown in equation (3).

[Parallel] |xa yb–xb ya|<Δ          (2)

[For horizontal edge] |ya–yb|<Δ

[For vertical edge] |xa–xb|<Δ          (3)

While the document edge detection apparatus as described in the above embodiment obtains candidate edge points by scanning an image and searching for edge patterns, the method of obtaining edge point coordinates is not limitative. Instead, for example, a number of optical sensors may be disposed along the paper transport path of the scanner for horizontal edge detection purposes and the coordinates of points along the horizontal edge of a document calculated from the relationship between the time at which each sensor detects the document edge and the speed at which the document is being transported.

Similarly, the invention is not limited to the use of the method of least squares, as described in step 5, to obtain an equation to calculate a straight line that passes through the candidate points remaining in the horizontal edge coordinate memory 16. Instead, equations for straight lines linking pairs of adjacent points could be obtained with respect to all points left remaining by step 4, the average value of line inclination and y segments obtained and these average values used as the line inclination and y segment.

The above document edge detection apparatus uses coordinate memories, shift registers and edge pattern comparators to obtain candidate edge points. However, if the binarized image is first stored in an image memory and the image data directly processed by the CPU 17, a program could be used to carry out the detection of edge patterns, the elimination of points that do not represent the true position of an edge, and the calculation of lines representing edges.

Again, the above embodiment was described with reference to using data relating to an edge orthogonal to the edge of interest. However, if the search of T0, T1, ..., Tj–2 for orthogonal direction vectors referred to in step 3 is omitted, it becomes possible to perform edge detection without resorting to such orthogonal edge data. If, however, the only data used is that relating to the edge of interest, it becomes difficult to perform accurate edge detection on documents that are damaged, creased or soiled, or which have a large skew angle.

The invention has been described in detail with particular reference to certain preferred embodiments thereof, but it will be understood that variations and modifications can be effected within the spirit and scope of the invention.

What is claimed is:

1. A document edge detection apparatus comprising:

(a) edge point detection means for detecting at equal intervals in a primary scanning direction and in a secondary scanning direction perpendicular to the primary scanning direction a plurality of binarized points along at least two edges of a rectangular document image in a two-dimensional image space;

(b) direction vector creation means for creating direction vectors by connecting adjacent pairs of the plurality of binarized edge points detected by the edge point detection means;

(c) counting means for counting each of the direction vectors created by said vector direction means and the number of other direction vectors that have a parallel relationship with vectors included along one document edge in the secondary scanning direction and the number of direction vectors having a perpendicular relationship with vectors included along another document edge in the primary scanning direction;

(d) selection means for retaining the points of the direction vectors with the highest count together with vectors parallel thereto in the secondary scanning direction and eliminating points belonging to other direction vectors having a lower count and retaining the points of the direction vectors having a perpendicular relationship with vectors included along another document edge in the primary scanning direction; and (e) edge calculation means responsive to points retained by the selection means for each of the scanning directions for obtaining an equation of a straight line for each one of the two edges of the rectangular document image that is coincident with its corresponding document edge.

* * * * *